United States Patent [19]

Takai et al.

[11] Patent Number: 5,132,905
[45] Date of Patent: Jul. 21, 1992

[54] SYSTEM AND METHOD APPLICABLE TO VEHICLES FOR COMMUNICATING BETWEEN DATA PROCESSING STATIONS

[75] Inventors: Hideo Takai; Tohru Futami, both of Kangawa, Japan

[73] Assignee: Nissan Motor Company Limited, Kanagawa, Japan

[21] Appl. No.: 450,977

[22] Filed: Dec. 15, 1989

[30] Foreign Application Priority Data

Dec. 28, 1988 [JP] Japan ............... 63-334670
Aug. 7, 1989 [JP] Japan ............... 1-202885

[51] Int. Cl.$^5$ ............... G06F 13/00
[52] U.S. Cl. ............... 364/424.03; 364/132; 340/825.06
[58] Field of Search ............... 364/424.01, 424.03, 364/424.04, 900, 132, 431.01, 431.12; 340/825.06–825.08, 825.13

[56] References Cited

U.S. PATENT DOCUMENTS

| | | | |
|---|---|---|---|
| 4,757,463 | 7/1988 | Ballou et al. | 364/551.01 |
| 4,787,040 | 11/1988 | Ames et al. | 364/424.01 |
| 4,823,312 | 4/1989 | Michael et al. | 364/900 |
| 4,845,609 | 7/1989 | Lighthart et al. | 364/200 |
| 4,906,970 | 3/1990 | Momura | 340/459 |
| 4,926,352 | 5/1990 | Staffe | 364/550 |

*Primary Examiner*—Thomas G. Black

[57] ABSTRACT

A system and method applicable to a vehicle for communicating between data processing stations are disclosed in which successive initializing commands (INIT) are transmitted by a master station performed by a diagnostic device to all subordinate electronic control units, which are data processing stations, at a predetermined time interval. The number of INIT commands transmitted corresponds to the number of information signals transmitted to a selected control unit after a control command to the selected control unit is executed. For example, in a case where two information signals are transmitted, the two successive initializing commands are transmitted to each control unit. In this case, the command code transmitted from the master station prior to the information signals is different from a system call command code even if both of the information signals have the same information as the initializing commands. Therefore, no erroneous response to the information signals by a non-selected control unit occurs.

21 Claims, 4 Drawing Sheets

FIG. 4

| MAN(OPERATION) | MASTER STATION | | CONTROL UNIT |
|---|---|---|---|
| • CONNECT MASTER STATION TO DIAGNOSTIC CONNECTOR • TURN ON POWER SUPPLY • SELECT DIAGNOSING CONTROL UNIT (SELECT CONTROL UNIT DISPLAYED ON THE SCREEN BY TEN KEYS) | • 1.FIRST CONTROL UNIT 2.SECOND CONTROL UNIT  *41* | • TRANSMIT INT TWICE  • TRANSMIT SC(I) COMMAND | • SYSTEM COMMAND WAITE  • TRANSMIT ECHO BACK $\overline{SC(I)}$ |
| • SET DIAGNOSING MODE (A CASE WHERE IDLING SPEED OF THE ENGINE IS SET TO 1500 R.P.M.) • SELECT MODE FROM SCREEN DISPLAY BY TEN KEYS | • 1.DISPLAY SELF DIAGNOSTIC RESULT 2.DISPLAY IDLING R.P.M.  *42* | | |
| • INPUT ENGINE R.P.M. BY TEN KEYS | • 1500 R.P.M.  *43* • 1502 R.P.M.  *44* | • TRANSMIT PS • TRANSMIT 1st BYTE OF INFORMATION BYTE • TRANSMIT 2nd BYTE OF INFORMATION BYTE | • TRANSMIT $\overline{PS}$ • ECHO BACK 1st BYTE ON INFORMATION BYTE • ECHO BACK OF INFORMATION BYTE |
| • PUSH END KEY | | • TRANSMIT Ex COMMAND • TRANSMIT STP COMMAND | • TRANSMIT DATA • TRANSMIT $\overline{STP}$ END |

SYSTEM AND METHOD APPLICABLE TO VEHICLES FOR COMMUNICATING BETWEEN DATA PROCESSING STATIONS

BACKGROUND OF THE INVENTION (1) Field of the invention

The present invention relates to a system and method for communicating between data processing stations such as a master station (i.e. a diagnostic device) and various substations (i.e. electronic control units installed in a vehicle) to diagnose problems in electronic control units (ECU's) controlling vehicle components such as, for example, a vehicular engine.

(2) Description of the background art

Along with recent technological developments in semiconductor devices, essential vehicle components have rapidly become electronically controlled and a multiple number of microprocessors have found their way into most vehicles to be used as electronic control units (ECUs) for such as engine control, etc.

Although such electronically controlled systems achieve high-performance and make for more comfortable vehicles, diagnosis of malfunctions in the control units is very complex. This is because it is often difficult to trace the causal relationship between a generated phonomenon and its cause, a high degree of technological knowledge is needed to analyze such causal relationships and such minute electrical signals are susceptible to external noises, as well as intermittent discontinuities.

Therefore, although many electronic control units add self-diagnostic functions, however, since such diagnoses are carried out on an on-board basis, and the microprocessors of most ECU's are rather small, their processing capabilities are restricted.

In response to the above, a master station constituting an off-board diagnostic device which carries out off-board diagnoses and which is capable of making precise, high-quality diagnosis has been developed.

In a case where each electronic control unit installed in the vehicle is diagnosed from the master station, the master station selects a desired electronic control unit from among the plurality of electronic control units installed in the vehicle, transmits a diagnostic control command to the selected electronic control unit, and receives return data from the selected electronic control unit in response to the diagnostic control command.

In such a data communication as described above, the master station initially transmits an initializing command to set each electronic control unit via a communication circuit located between the master station and the plurality of electronic control units to place the ECU's in a receive standby state for a system call command which will select the desired electronic control unit from among the plurality of electronic control units.

Upon transmission of the command through the communication circuit setting each electronic control unit in the receive standby state for a system call command, the master station transmits the system call command to preselect only a desired electronic control unit so that a data link from the master station to the selected electronic control unit is established.

When the data link is established between the master station and the selected electronic control unit, the master station transmits a control command such as a parameter set command, the control command being issued to cause the selected electronic control unit to execute a desired control operation. The control command is followed, at a predetermined time interval, by two information bytes which are successively transmitted subsequent the control command. The two information bytes also have a predetermined time interval provided therebetween. The item to be controlled is set by the first information byte and the controlled variable thereof is set by the subsequent second information byte. Then, the master station monitors the response characteristic of the vehicle system controlled by the selected ECU to compare that the vehicle response correlates with the ECU parameter specified by the control command. Diagnosis of malfunction in the electronic control unit is carried out in this way.

However, in communication between the master station and an electronic control unit, after the master station transmits the initialize command to each electronic control unit via the communication circuit, and selects a particular ECU for establishing a data link the following problems can occur; due to the limited combinations of 1 and 0 which are allowed within a single byte, and the large number of control parameters utilized by the master station, it is possible that the first information byte transmitted after a control command may contain the same bit combination as the initialize command and the second information byte may contain the same bit combination as a system call command to an electronic control unit other than the selected electronic control unit, the other non-selected electronic control unit would then erroneously respond to the false initialize command constituted by the first information byte and system call command constituted by the second information byte.

In more detail, a normal echoback signal from the selected electronic control unit would be destroyed due to the new echoback signal from the other electronic control unit responding to the erroneous system call command. Consequently, normal communication between the master station and the selected electronic control unit will not be achieved.

SUMMARY OF THE INVENTION

It is an object of the present invention to provide a system and method for communicating between each data processing station which will prevent erroneous response from non-selected electronic control units and can carry out appropriate communication with the selected electronic control unit.

The above-described object can be achieved by providing a communication system, comprising: a) a plurality of subordinate data processing stations (substations); b) a master data processing station; c) a communication circuit interconnected between the master station and the substations; d) first means for transmitting a select command via the communication circuit to select a desired one of the substations to be communicated with the master station, for transmitting a predetermined command to the selected substation to carry out a predetermined data handling operation and for transmitting at least two information signals related to the predetermined command and e) second means for transmitting initializing commands via the communication circuit to each substation to set each substation in a receive standby state for the select command, the initializing command repeated a number of times which corresponds to the number of information signals successively transmitted at a provided, predetermined time interval for the predetermined command.

The above-described object can also be achieved by providing a system for communicating between each data processing station, comprising: a) a plurality of electronic control units (ECUs), each control unit carrying out a predetermined control operation on a controlled object; b) an off-board diagnostic device; c) a communication circuit interconnected between the diagnostic device and the control units; e) first means for transmitting a select command via the communication circuit to select a desired one of the substations to be communicated with the diagnostic device and for transmitting a control command to the selected control unit to carry out a predetermined control operation and thereafter transmitting at least two information signals related to the predetermined command, the information signals indicating the contents of the predetermined control operation; and f) second means for transmitting initializing commands via the communication circuit to each control unit to set each control unit in a receive standby state for receiving a select command, the initializing command being repeated a number of times corresponding to that of the information signals successively transmitted at a predetermined time interval for the control command.

The above-described object can also be achieved by providing a communication method, comprising the steps of: a) providing a plurality of subordinate data processing stations; b) providing a master data processing station; c) providing a communication circuit interconnected between the master station and the substations; d) transmitting initializing commands via the communication circuit to each substation to set each substation in a receive standby state for a select command, the initializing command being transmitted a number of times which corresponds to the number of information signals successively transmitted, the information signals having a predetermined time interval provided therebetween; and e) transmitting a select command via the communication circuit to select a desired one of the substations to be communicated with the master station, transmitting a predetermined command to the selected substation to carry out a predetermined data handling operation, and transmitting at least two information signals related to the predetermined command.

BRIEF DESCRIPTION OF THE DRAWINGS

FIG. 4 is a table showing an operation of the communicating system shown in FIG. 1, and the steps in the execution thereof.

DETAILED DESCRIPTION OF THE PREFERRED EMBODIMENT

Reference will hereinafter be made to the drawings in order to facilitate a better understanding of the present invention.

Figure 1:
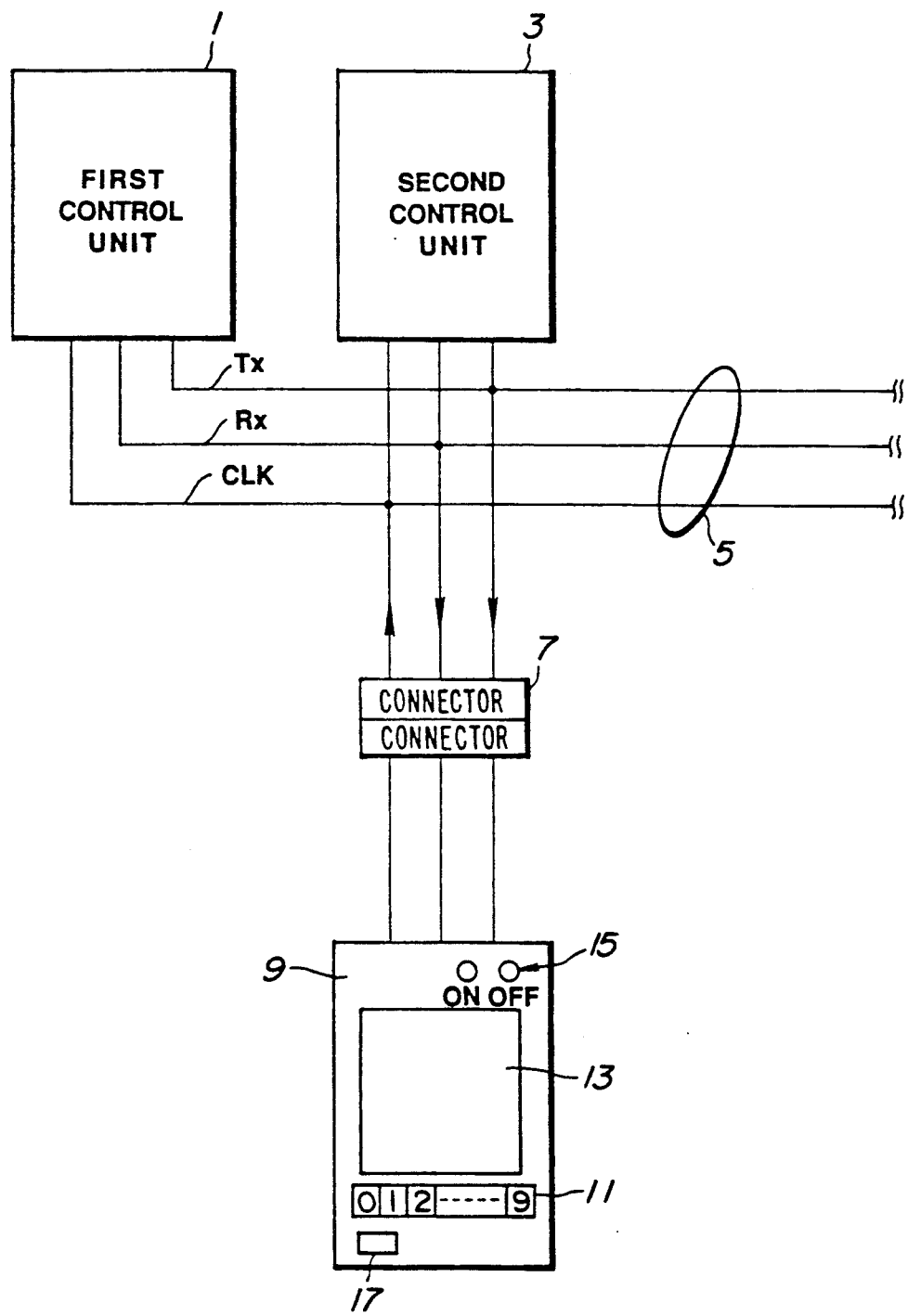
FIG. 1 is a schematic circuit block diagram of a system for communicating between data stations applicable to a vehicle in a preferred embodiment according to the present invention.

FIG. 1 shows a preferred embodiment of a system for communicating between data processing stations applicable to a vehicle.

In FIG. 1 a plurality of control units 1, 3, including electronic control units (ECU's) such as an engine control unit, A/T (automatic transmission) control unit, and so on which constitute a control portion of the vehicle are interconnected to a signal line 5, the signal line 5 having an ECU data transmission line Tx, ECU data reception line Rx, and clock line CLK. A master station 9 is connected to the plurality of control units 1, 3, via the signal line 5 and connector 7.

The master station 9 constitutes an off-board diagnostic device which diagnoses the control portion of the vehicle having the plurality of the control units 1, 3, etc.

The master station 9 includes a ten key pad 11 for inputting various kinds of information, a display 13 for displaying diagnostic information, a power supply switch 15, and an end key 17 for terminating a series of diagnostic operations to be described later.

It is noted that although FIG. 1 shows only two control units 1 and 3 (first and second control units), various kinds of other control units may be installed.

The master station 9 selects a desired one of the plurality of control units 1 and 3, transmits various commands to diagnose the selected control unit, and receives information in response to the commands so as to carry out diagnoses for respective control units.

Figure 2:
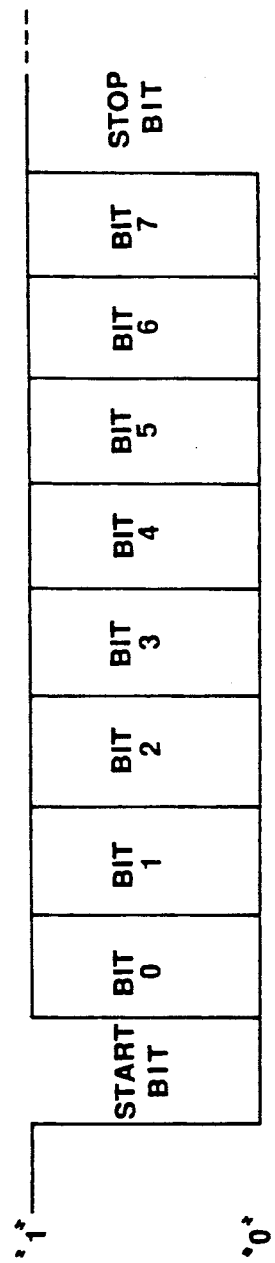
FIG. 2 is an explanatory view of the data format used in the communication system of the preferred embodiment shown in FIG. 1.

In data communication between the master station 9 and the various control units to which the master station 9 transmits commands an NRZ (Non-Return to Zero) method is used as a transmission path coding form, a so-called data modulation system, an UART (Universal Asynchronous Receiver/Transmitter) is built-in and used as a communication circuit to facilitate ECU data transmission and reception. In addition, as a data format, a one-bit start bit ("0")is added to a head portion, then, an eight-bit data is inserted into a portion after the start bit, and finally a one-bit stop bit ("1") is added after the eighth bit of data, as shown in FIG. 2. Each command and information signal used in the communication system uses this format. Furthermore, a polling/selection method is used as a transmission control method between the master station and each control unit, with the master station 9 being a main station and each control unit being a substation. Because the polling/selection method employs point-to-point communication between the off-board diagnostic device (master station) and the ECU selected. It has the advantage of simpler protocol and ECU software than a multi-master method.

The master station 9 selects a desired control unit from among the plurality of control units 1 and 3 on the basis of the modulation method and transmission control method, and transmits various types of commands and information bytes for carrying out various diagnoses in the selected control unit and receives an echo back signal responding to the diagnostic commands thus carrying out diagnostic operation.

Control procedures to execute selection and diagnostic operation are divided into four phases 0 through 3 as shown in the following Table.

| Phase | Control Contents |
| --- | --- |
| 0 | Circuit (Bus) initialization & Link Termination |
| 1 | Control Unit Selection & |

-continued

| Phase | Control Contents |
| --- | --- |
| 2 | Link Establishment<br>Diagnostic Mode Setting |
| 3 | Diagnosis Execution<br>& Termination |

Next, an operation of the preferred embodiment will be described below with reference to the above-described Table, the timing chart shown in FIG. 3, and the operation table of FIG. 4, in a case where engine revolution speed is diagnosed and changed.

Figure 3:
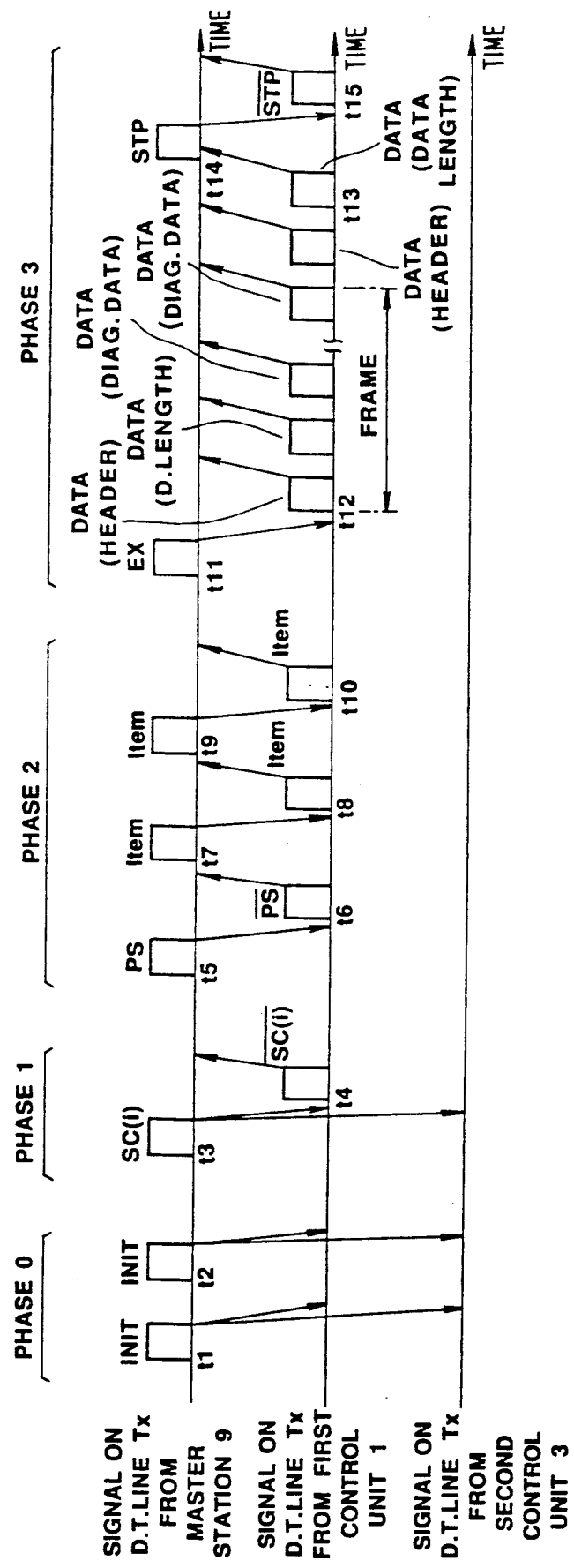
FIG. 3 is a timing chart showing the timing sequence for operation of the communication system shown in FIG. 1.

It is noted that each phase 0 through 3 defined in the above-described Table is denoted in a time axis in the lateral direction of the timing chart of FIG. 3 and the control procedures by means of the master station 9 are sequentially executed in accordance with each phase.

First, in order to diagnose a control unit using the master station, the connector 7 connects the master station 9 to each control unit (1 and 3), as described in the operator input column (machine operation) of FIG. 4, and thereafter the power supplies of both master station the control units 1 and 3 are turned on so as to operate the system for communicating between each station.

First, an initializing command, applicable to all control units is sent.

If echoback signals are returned from all control units (1, 3, —) to the master station 9 as a responding signal, the master station 9 might not be able to read all the echoback data. Therefore, an echoback signal is returned from only one control unit, after a data link with that unit has been established.

With the power supply turned on and the system in operation, the master station 9 enters Phase 0. Then, "1. First Control Unit", "2, Second Control Unit", —is displayed to indicate all control units presently connected to the master station 9, as denoted by 41 in FIG. 4. In addition, the master station 9 successively twice transmits initializing commands INIT at a predetermined time interval, as shown in times t1 and t2 of FIG. 3.

Each control unit 1 and 3, upon receipt of the successive initializing commands INIT, enters a receive standby state for a system call command (to be described later). The signal line 5, particularly, the data transmission line Tx thereof, enters an idle state so that the circuit constituted by the signal line 5 is initialized.

If, at this time, the control unit with which a data link is being established is on line, the control unit terminates communication and enters a receive standby state for a system call command.

As described above, when the communication circuit constituted by the signal line 5 is initialized and the control units 1 and 3 enter the receive standby state for system call command, the master station 9 becomes begins phase 1. In this phase, the master station 9 is operated to select the desired control unit to be diagnosed from among the control units 1 and 3 by the operator. Therefore, a ten key pad 11 at the master station 9 is used to select the number assigned to the desired control unit.

One of system call commands SC (i) which corresponds to the selected control unit is transmitted, as shown by t3 of FIG. 3.

It is noted that FIG. 3 shows a case where the first control unit 1 is selected and the system call command SC (i) is transmitted from the master station 9 to the first control unit 1.

When the system call command SC (i) transmitted from the master station 9 is received by the selected first control unit 1, the selected first control unit 1 transmits its echoback signal $\overline{SC}$ (i) which is a reversed signal (logically opposite) to the corresponding system call command SC (i) in order to inform the master station 9 of receipt of the system select command SC (i) at a time denoted by t4 of FIG. 3.

The master station 9 receives the reversed echo back signal $\overline{SC}$ (i). When the master station 9 confirms that the reversed echo back signal is derived from the first control unit 1, the data link between the master station 9 and first control unit 1 is established.

It is noted that, at this time, the other control units, i.e., the second control unit 3, not selected are returned to the receive standby state and is held in that state until subsequent initializing commands (INITs) are twice received.

Hence, it becomes possible in communication that only the first control unit 1 selected for the establishment of a data link will be communicated with the master station 9.

In this way, when the data link is established between the selected first control unit 1 and master station 9, the master station enters Phase 2 to set a diagnostic mode. In this phase, a list of diagnostic functions which can be executed by the master station 9 is displayed through the display 13 of the master station 9 as denoted by 42 of FIG. 4.

To set the diagnostic mode in Phase 2, the master station 9 transmits the mode setting command. Various commands are provided in the mode set command, i.e., self-defined commands and control commands such as parameter set commands PS having, e.g., information bytes subsequent to the control command.

The parameter set command PS is, e.g., a command to cause the engine control unit 1 to set the engine in a particular state and, e.g., two information bytes subsequent to the command are transmitted with a predetermined time interval provided therebetween. For example, in a case where an engine idling revolution speed is set at 1500 R. P. M., the master station 9 transmits the two information bytes, the first information byte indicating "engine idling revolution speed" and the second information byte indicating "1500 R. P. M.".

Hence, suppose that an operator encounters a case where the engine idling revolution speed is to be set at 1500 R. P. M. as in the diagnostic mode described above. The operator selects the diagnostic mode for the parameter set command from the display 13 of the master station 9 through the ten key pad 11.

Then, the operator specifies the "revolution speed" and "1500 R.P.M." as the information bytes to the parameter set command through the ten key pad 11. At this time, the display 13 of the master station 9 displays "revolution speed" and "1500 R. P. M.", as shown by 43 of FIG. 4. Thereafter, the parameter set command PS is transmitted to the first control unit 1 from the master station 9, as shown by time t5 of FIG. 3.

The first control unit 1, upon receipt of the parameter set command PS from the master station 9, returns back the echoback signal $\overline{PS}$ which is the reversed signal of the parameter set command PS to confirm the receipt of the parameter set command PS at a time denoted by t6 of FIG. 3 so that the first control unit 1 assumes the information byte wait state. When the master station 9 confirms that the echo signal transmitted from the first control unit 1 is the inversed data of the previously transmitted parameter set command PS, the master station 9 transmits the first information byte Item indicating "engine revolution speed" to the first control unit 1 at a time denoted by t7 of FIG. 3.

When the first control unit 1 receives the first information byte Item, the first control unit 1 returns an echoback signal of the same data configuration as the first information byte, i.e., a non-inverted echo back signal to the master station 9, at the time denoted by t8 of FIG. 3.

When the master station 9 confirms that the echo back signal from the first control unit 1 is the same as the previously transmitted first information byte, the second information byte Item indicating 1500 R. P. M. is transmitted to the first control unit 1 at the time denoted by t9 of FIG. 3.

The first control unit 1 receives the second information byte Item and then returns an echoback signal of the same data configuration as the second information byte Item previously transmitted to the master station 9 at a time t10 of FIG. 3 to terminate the parameter set command PS. Each information byte may arbitrarily set to any of the many items and control values controllable by lthe ECU's within a prescribed data length.

The master station 9 terminates the diagnostic mode through the parameter set command PS as described above. At this time, the master station 9 enters Phase 3 so that a diagnostic execution command Ex is transmitted to the first control unit 1 at a time denoted by t11 of FIG. 3. The first control unit 1 receives the diagnostic execution command EX from the master station 9. Then, the first control unit 1 carries out execution of the control item set in the previous parameter set command PS to the control value specified, such as, "engine revolution speed" and "1500 R. P. M." Diagnostic data of the engine revolution speed, when executed, is repeatedly sent from the first control unit 1 to the master station 9 until a diagnostic termination command STP is transmitted to the master station 9 from the first control unit 1. The diagnostic data is sent back in one frame which is constituted by a one-byte header, a one-byte data length, and data of 254 bytes or less.

The diagnostic data returned from the first control unit 1 is received by the master station 9 and the received diagnostic data is displayed through the display 13 of the master station 9 as shown in FIG. 4. The control value is modified as prescribed and normal operation of the engine in relation to the control unit is confirmed. It is noted that the diagnostic data on engine revolution speed displayed on the display 13 is 1502 R. P. M. and this is a substantially normal value.

When the diagnostic data is obtained as described above, the operator pushes an end key 17 on the master station 9. Upon pushing the end key 17, the master station 9 transmits the diagnostic termination command STP to the first control unit 1 at a time denoted by t14 of FIG. 3.

Upon receipt of the diagnostic termination command, the first control unit 1 clears the control commands presently set and returns the echoback signal $\overline{STP}$ which is the reverse of the received diagnostic termination command data STP to the master station 9 at a time denoted by t15 of FIG. 3. Upon receipt of the reversed echo back signal $\overline{STP}$ from the first control unit 1, diagnosis of the first control unit is terminated.

Although in the preferred embodiment the two information bytes are transmitted and the initializing commands INITs are correspondingly transmitted twice, the initializing commands may be transmitted three times in a case where the information bytes of a control command are also three consecutive bytes. That is to say, a number of initializing commands INITs corresponding to the number of information bytes may be transmitted.

Therefore, e.g., in a case where two information signals are transmitted, initializing commands INITs are twice transmitted to each control unit. However, even though both of the information bytes may have the same information as the initializing commands, the command subsequent to the information bytes is always constituted by a code different from the system call command. Thus, non-selected control units cannot erroneously respond and appropriate communication between stations can be normally carried out.

It will be fully appreciated by those skilled in the art that the foregoing description is made in terms of the preferred embodiment and various changes and modifications may be made without departing from the spirit and scope of the invention as defined by the appended claims.

What is claimed is:

1. A communication system, comprising:
a) a plurality of data processing substations;
b) a master data processing station;
c) a communication circuit interconnected between the master station and the substations;
d) first means for transmitting a select command via the communication circuit to select a desired one of the substations to be communicated with the master station, for transmitting a predetermined command to the selected substation to carry out a predetermined data handling operation and for transmitting at least two information signals in response to the predetermined command; and
e) second means for transmitting a plural number of successive initializing commands via the communication circuit to each substation to set each substation in a receive standby state for the selected command for a period responsive to said number of successive initializing commands, the number of initializing commands being equal to the number of information signals successively transmitted during a predetermined time interval for the predetermined command.

2. A data communication system, comprising:
a) a plurality of electronic control units, each control unit carrying out a predetermined control operation on a controlled object;
b) an off-board diagnostic device;
c) a communication circuit interconnected between the diagnostic device and the control units;
d) first means for transmitting a select command via the communication circuit to select a desired one of the control units to be communicated with the diagnostic device and for transmitting a control command to the selected control unit to carry out a predetermined control operation and thereafter transmitting at least two information signals indicating results of the predetermined control operation; and
e) second means for transmitting a number of successive initializing commands via the communication circuit to each control unit to set each control unit in a receive standby state for receiving a select command, the number of successive initializing commands being equal to a number of the information signals successively transmitted during a predetermined time interval for the predetermined control command.

3. A system as set forth in claim 2, wherein the data transmitted in the communication circuit is modulated in a NRZ (Non-Return-to-Zero) method.

4. A system as set forth in claim 2, wherein the first means and second means are installed in the diagnostic device.

5. A system as set forth in claim 2, wherein the communication circuit includes a UART.

6. A system as set forth in claim 2, wherein said plurality of electronic control units includes an engine control unit for controlling engine operation of a vehicle.

7. A system as set forth in claim 6, wherein the diagnostic device transmits the select command to the engine control unit after the initializing commands are twice transmitted to the engine control unit.

8. A system as set forth in claim 7, wherein the engine control unit transmits an echoback signal to the diagnostic device, the echoback signal being the reverse of the select command signal, establishing a data link between the diagnostic device and engine control unit.

9. A system as set forth in claim 8, wherein the diagnostic device transmits a parameter set command to the engine control unit and thereafter the engine control unit transmits an echoback signal, which is the reverse of the parameter set command signal, back to the diagnostic device to confirm receipt of the parameter set command.

10. A system as set forth in claim 9, wherein the information signals comprise data including an item to be controlled by the engine control unit and the controlled value of said item.

11. A system as set forth in claim 10, wherein the engine control unit returns echoback signals to the diagnostic device of the same content as the information signals received from the diagnostic device.

12. A system as set forth in claim 11, wherein the diagnostic device transmits a diagnostic execution command to the engine control unit after receiving the echoback signals from the engine control unit.

13. A system as set forth in claim 12, wherein the engine control unit transmits at least one frame of data including a header, a data length and diagnostic data to the diagnostic device after receipt of a diagnostic execution command from the diagnostic device.

14. A system as set forth in claim 13, wherein the diagnostic device transmits a diagnostic termination command to the engine control unit after the final diagnostic data is received and then the engine control unit transmits an echoback signal, which is the reversed of the diagnostic termination command signal, back to the diagnostic device.

15. A system as set forth in claim 14, wherein other control units including an automatic transmission unit enter the receive standby state after the receipt of successive initializing commands from the diagnostic device.

16. A system as set forth in claim 10, wherein the diagnostic device includes a display for displaying information on the items to be controlled and a ten key pad for inputting controlled value information to the controlled object.

17. A system as set forth in claim 16, wherein the display displays diagnostic data from the engine control unit as the result of execution of the diagnostic execution command.

18. A system as set forth in claim 16, wherein the ten key pad is used to input the number assigned to a control unit to be selected.

19. A system as set forth in claim 16, wherein the diagnostic device includes an end key to terminate a diagnostic operation carried out from the diagnostic device.

20. A communication method for providing communication between a master data processing station and a plurality of subordinate data processing substations on a communication circuit interconnecting the master stations and the substations, comprising the steps of:
a) transmitting a plural number of successive initializing commands via the communication circuit to each substation to set each substation in a receive standby state for a select command for a time interval responsive to said number of successive initializing commands transmitted, the number of initializing commands being transmitted being equal to a number of information signals successively transmitted, the information signals having a predetermined time interval provided therebetween; and
b) transmitting a select command via the communication circuit to select a desired one of the substations to be communicated with the master station, transmitting a predetermined command to the select substation to carry out a predetermined data handling operation, and transmitting said at least two information signals related to the predetermined command.

21. A method of communication between an offboard diagnostic device and a plurality of electronic control units on a communication circuit interconnecting the diagnostic device and the control units, said method comprising the steps of:
a) transmitting a select command via the communication circuit to select a desired one of the control units to be communicated with the diagnostic device;
b) transmitting a control command to the selected control unit to carry out a predetermined control operation;
c) transmitting at least two information signals indicating results of the predetermined control operation; and
d) transmitting a number of successive initializing commands via the communication circuit to each control unit to set each control unit in a receive standby state for receiving a select command, the number of successive initializing commands being equal to a number of the information signals successively transmitted during a predetermined time interval for the predetermined control command.

* * * * *

UNITED STATES PATENT AND TRADEMARK OFFICE
CERTIFICATE OF CORRECTION

PATENT NO. : 5,132,905
DATED : July 21, 1992
INVENTOR(S) : Takai et al

It is certified that error appears in the above-identified patent and that said Letters Patent is hereby corrected as shown below:

On the title page:
    Item [75]: Inventors, please change "Kangawa" to --Kanagawa--.

Signed and Sealed this

Thirty-first Day of August, 1993

Attest:

BRUCE LEHMAN

*Attesting Officer*      *Commissioner of Patents and Trademarks*